United States Patent [19]

Rogers et al.

[11] 3,725,341

[45] Apr. 3, 1973

[54] PROCESS FOR THE PREPARATION OF HIGH MOLECULAR WEIGHT POLYEPOXIDES FROM POLYEPOXIDES AND POLYHYDROXYL-CONTAINING COMPOUNDS

[75] Inventors: Morris Gwynne Rogers, Sarnia, Ontario, Canada; James Hwa-San Tsai, Kaohsiung, Taiwan

[73] Assignee: The Dow Chemical Company, Midland, Mich.

[22] Filed: June 23, 1971

[21] Appl. No.: 156,101

[52] U.S. Cl. ........260/47 EP, 260/18 EP, 260/47 EC, 260/59, 260/348 R, 260/613 B
[51] Int. Cl. .............................................C08g 30/04
[58] Field of Search ..260/47 EP, 47 EC, 2 EP, 2 EC, 260/59, 18 EP, 830, 613 B, 348; 252/431, 429.7, 435, 448.2

[56] References Cited

UNITED STATES PATENTS 3,398,211 8/1968 Ramos..................................260/2 X
3,150,116 9/1964 Masters..................................260/47

*Primary Examiner*—William H. Short
*Assistant Examiner*—T. Pertilla
*Attorney*—Raymond B. Ledlie et al.

[57] ABSTRACT

The invention concerns a process for preparing epoxy resins of increased molecular weight by reacting a polyepoxide such as the diglycidyl ether of bisphenol-A with a polyhydroxyl-containing compound, such as bisphenol-A in the presence of an organometallic compound of tin, germanium, silicon and lead, such as trimethyltin chloride.

9 Claims, No Drawings

PROCESS FOR THE PREPARATION OF HIGH MOLECULAR WEIGHT POLYEPOXIDES FROM POLYEPOXIDES AND POLYHYDROXYL-CONTAINING COMPOUNDS

This invention relates to the preparation of polyepoxide-containing and polyhydroxyl-containing compositions and more particularly relates to the preparation of polyglycidyl ethers from a polyglycidyl ether and an aromatic polyhydroxyl-containing compound wherein the resultant polyglycidyl ether is higher in molecular weight than the starting polyglycidyl ether, said preparation being conducted in the presence of an organometal compound wherein the metal is silicon, germanium, tin or lead.

Polyglycidyl ether compounds have been prepared from polyglycidyl ethers and polyhydroxyl-containing compounds in the presence of such catalysts as tertiary amines, phosphonium compounds, quaternary ammonium compounds, alkali metal hydroxides and the like. Industry, however, is always seeking alternate methods and processes for preparing polyepoxides.

It has now been discovered that organometal compounds, wherein the metal is tin, silicon, germanium or lead, can be employed as the catalyst in the reaction of a polyepoxide with a polyhydroxy compound.

The organometal compounds which are employed in the process of the present invention may be represented by the general formula

wherein each R is independently selected from the group consisting of alkyl groups of from 1 to 10 carbon atoms, aryl groups, alkaryl groups, and aralkyl groups; X is sulfur, oxygen, hydroxide, alkoxide, alkanoate, or a halogen having an atomic number from 9 to 53 inclusive; M is tin, silicon, germanium or lead; $y$ is an integer from 1 to 2; $z$ has a value of from 1 to 2 and when $z$ has a value of 2, X is sulfur or oxygen.

In the above formula, suitable alkoxides include those having from about 1 to about 8 carbon atoms and preferably from about 1 to about 4 carbon atoms. Suitable lower alkanoates include those having from about 1 to about 8 carbon atoms and preferably from about 1 to about 4 carbon atoms and includes such alkanoates as formates, acetates, propionates and the like.

Suitable such organotin compounds include, for example, trimethyl stannic chloride, trimethyl stannic bromide, trimethyl stannic iodide, triphenyl stannic chloride, triphenyl stannic bromide, triphenyl stannic iodide, trioctyl stannic chloride, trioctyl stannic bromide, trioctyl stannic iodide, ethyl diphenyl stannic chloride, diethylphenyl stannic bromide, tributyl stannic iodide, tribenzyl stannic chloride, dimethyl stannic dichloride, di(methylphenyl)stannic dibromide, tributyltin methoxide, tributyltin acetate, tributyltin formate, bis(tri-N-butyl-tin)sulfide, bis(tri-N-butyltin)oxide, and the like.

Suitable organo silicon compounds include, for example, trimethylsilicon chloride, triethyl silicon chloride, triphenylsilicon chloride, diphenylsilicondichloride and the like.

Suitable organolead compounds include, for example, diphenyllead dichloride, triethyllead chloride and the like.

Suitable organogermanium compounds include, for example, diphenylgermanium dichloride, tributylgermanium chloride and the like.

The polyepoxides used in the process of the invention comprise those compounds possessing more than one 1,2-epoxide group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

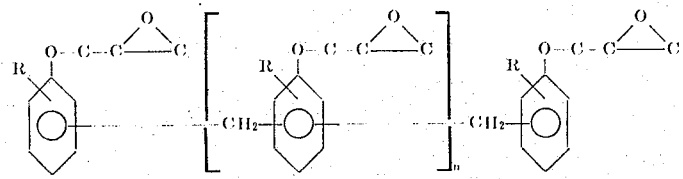

wherein R is hydrogen or an alkyl radical and $n$ is an integer of 1 to about 10. Preparation of these polyepoxides is illustrated in U.S. Pat. No. 2,216,099 and U.S. Pat. No. 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9, 12,15-octadecatrienoate, butyl eleostearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate, diglycidyl adipate, diglycidyl isophthalate, di(2,3-epoxybutyl)adipate, di(2,3-epoxybutyl)oxalate, di-(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl) maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri-(2,3-epoxybutyl)1,2,4-butanetricarboxylate, di(5,6-epoxypentadecyl)tartarate, di(4,5-epoxytetradecyl)maleate, di(2,3-epoxybutyl)azelate, di(3,4-epoxybutyl)citrate, di-(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxyhexyl, 3,4-epoxypentanoate; 3,4-epoxycyclohexyl,3,4-epoxycyclohexyl methyl epoxycyclohexane carboxylate.

Still another group of the epoxy-containing materials include epoxidized derivatives of polyethylenically unsaturated polycarboxylic acids, such as, for example, dimethyl 8, 9, 12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-di-carboxylate; dicyclohexyl 3,4,5,6-diepoxycyclohexane- 1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyester obtained by reacting an unsaturated polyhydric and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The polyhydroxyl-containing compounds employed in the process of the invention are phenolic compounds possessing at least 2 OH groups attached to an aromatic nucleus. The phenols may be substituted with a great variety of different types of substituents. Examples of the polyhydroxyl-containing compounds include, resorcinol, pyrocatechol, hydroquinone, pyrogallol, hydroxyhydroquinone, 2,2-bis(4-hydroxyphenyl)propane, 2,2-bis(4-hydroxyphenyl) pentane, 2,2-bis(4-hydroxyphenyl)phloroglucinol, 2,2-bis (4-hydroxyphenyl)propane, 2,2-bis(4-hydroxyphenyl)methane, 2-methoxyphenol, 2,4-dibutoxyphenol, 2,5-dichlorphenol, 3-acetoxyphenol, 2,2-bis(3-allyl-4-hydroxyphenyl)propane, 2,2-bis(3-isobutyl-4-hydroxyphenyl)pentane, 1,1,2,2,-tetrakis(4-hydroxyphenyl)ethane, 1,1,4-4-tetrakis(4-hydroxyphenyl)pentane and the like, and polymeric type polyhydric phenols obtained by condensing monohydric or polyhydric phenols with formaldehyde, as well as phenols of the formulas

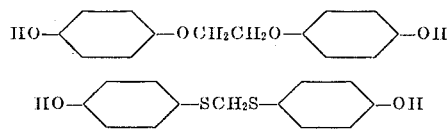

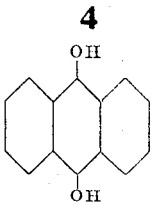

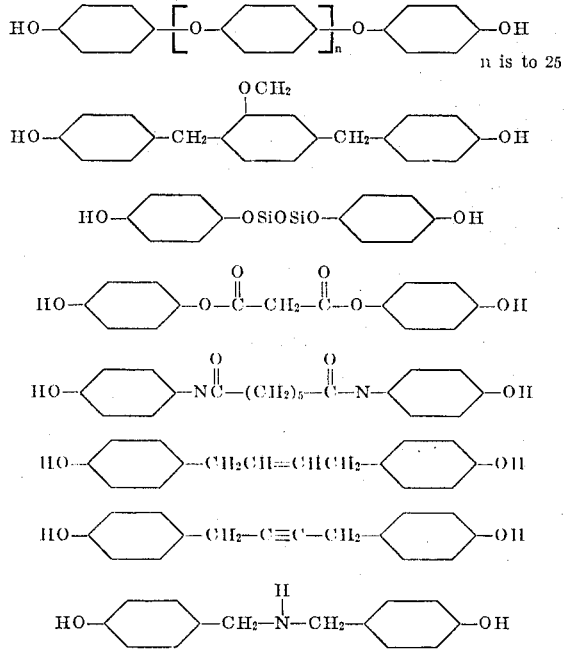

Preferred polyhydroxyl-containing compounds to be used are the polyhydric phenols containing from 2 to 6 OH groups and up to 30 carbon atoms. Coming under special consideration are the phenols of the formula

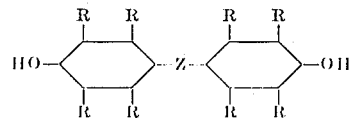

wherein Z is a polyvalent element or radical and R is a member of the group consisting of hydrogen, halogen and hydrocarbon radicals. The preferred elements or radicals represented by Z are oxygen, sulfur, —SO—, —SO$_2$—, bivalent hydrocarbon radicals containing up to 10 carbon atoms, and oxygen, sulfur and silicon-containing radicals, such as —ORO—, —ORORO—, —S—R—S—, —S—R—S—R—S, —OSiO—, —OSiOSiO—,

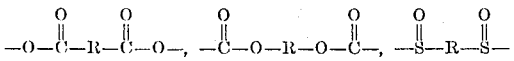

—SO$_2$—R—SO$_2$— radicals wherein R is a bivalent hydrocarbon radical.

The amount of the epoxide and the polyhydroxyl-containing compound to be employed in the process may vary over a wide range depending upon the type of reactants and the type of product to be desired. In some instances it may be desired to prepare compounds terminating in hydroxyl groups rather than epoxy groups. In these instances an excess of the polyhydroxyl-containing compound is employed.

The amount of the organometal catalyst will vary over a wide range. In general, amount of catalyst will vary from about 0.001 percent to about 10 percent by weight, and more preferably from about 0.05 percent to about 5 percent by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

When solvents are employed in the reaction and the resulting product is to be used for coating purposes, the solvent may be retained in the reaction mixture. Otherwise, the solvent can be removed by any suitable method such as by distillation and the like.

The reaction may be conducted in an inert atmosphere such as nitrogen at temperatures from about 50° to about 300°C, preferably from about 150°–200°C at pressures of from about 0.5 to about 10 atmospheres, preferably from about 1 to about 2 atmospheres for from about 5 minutes to about 24 hours, preferably from about 1 to about 10 hours.

The products obtained by the above process will be the desired phenolic hydroxy ether compounds. Their physical characteristics will depend upon the desired reactants and proportions. In general, the products will vary from liquids to solids, and in the case of the high molecular weight resins will vary from viscous liquids to hard solids. The products will possess at least one alcoholic OH group formed by each reaction of the epoxide and phenol OH group, and can be further reacted through this group or groups. The polyfunctional reactants will also give products terminated in phenolic OH groups and/or epoxy groups, and these will be available for further reaction.

A group of products which are particularly outstanding are those resins and polymers obtained by the reaction of the polyepoxides and polyhydric phenols in controlled proportions. Those which use an excess of the polyepoxide will be terminated in epoxy groups and can be used as polyepoxides in known reactions of polyepoxides with curing agents and the like. The new high molecular weight polyepoxides are particularly useful in preparing surface coatings, adhesives, laminates, filament windings, coatings for highways and airfields, structural applications, formation of foams and the like. Those prepared from the halogenated polyhydric phenols as shown hereinafter are particularly useful as flame proofing resins for forming laminates, coatings and the like.

The polyepoxides can be reacted with curing agents to form hard insoluble infusible products. The curing agents for the products include materials which are preferably acidic or alkaline. Examples of suitable curing agents include among others, the polybasic acids and their anhydrides, such as, for example, the di, tri and higher carboxylic acids as oxalic acid, phthalic acid, terphthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as for instance, dodecenedioic acid, 10,12-eicosadienedioic acid, and anhydrides as phthalic anhydride, succinic anhydride, malic anhydride, nadic anhydride, pyromellitic anhydride and the like.

Other types of acids that are useful are those containing sulfur, N, phosphorous or halogens; chlorendic acid, benzene phosphonic, sulfonyl dipropionic acid bis-(4-carboxyphenyl)amide.

Other preferred curing agents include the amine-containing compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperamine, N,N-dibutyl-1,3-propane diamine, N,N-diethyl-1,3-propane diamine, 1,2-diamino-2-methyl-propane, 2,3-diamino-2-methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, tetramethylpentane, meta-phenylene diamine and the like, and soluble adducts of amines and polyepoxides and their salts, such as described in U.S. Pat. No. 2,651,589 and U.S. Pat. No. 2,640,037. Still other examples include the acetone soluble reaction products of polyamines and monoepoxides, the acetone soluble reaction products of polyamines with unsaturated nitriles, such as acrylonitrile, imidazoline compounds as obtained by reaction of monocarboxylic acids with polyamines, sulfur and/or phosphorous-containing polyamines as obtained by reacting a mercaptan or phosphine containing active hydrogen with an epoxide halide to form a halohydrin, dehydrochlorinating and then reacting the resulting product with a polyamine, soluble reaction product of polyamines with acrylates and many other types of reaction products of the amines.

Still other curing agents that may be used include boron trifluoride and complexes of boron trifluoride with amines, ethers, phenols and the like, Friedel Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orothiophosphate, diethyl orthophosphate and hexaethyltetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and tri-merized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40°C., and preferably 20 to 250 poises at 40°C. Preferred polyamides also have amine values of 50 to 450.

Still another group of curing agents are those based on melamine reaction products containing methylol substituents.

The amount of curing agent may vary considerably depending upon the particular agent employed. For the alkalies or phenoxides, 1 to 4 percent is generally suitable. With phosphoric acid and esters thereof, good results are obtained with 1 to 10 percent added. The tertiary amine compounds are preferably used in amounts of about 1 to 15 percent. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active H (or anhydride group) per epoxy group.

Solvents or diluents may also be added to make the composition more fluid or sprayable. Preferred solvents or diluents include those which are volatile and escape from the polyepoxide composition before or during cure such as esters as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyanosubstituted hydrocarbons, such as acetonitrile, propionitrile adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials may also be added to the composition as desired. This includes other types of polyepoxides such as described in U.S. Pat. No. 2,633,458. This also includes fillers, as sand, rocks, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure will vary depending chiefly on the type of curing agent. The amino containing curing agents generally cure at or near room temperature and no heat need be applied. The acids, anhydrides, and melamine derivatives, on the other hand, generally require heat, such as temperatures ranging from 150°F. to about 400°F. Preferred temperatures range from about 200°F. to about 400°F. and more preferably from about 250°F. to 350°F.

The compositions containing the polyepoxides and curing agents may be used for a variety of important applications. They may be used, for example, as adhesives for metal, wood, concrete, plaster and the like, and as surface coatings for various types of surfaces. The new compositions may also be used in the preparation of laminates or resinous particles reinforced with fibrous textiles. They may also be used in the formation of castings and molding and for the encapsulation of electrical equipment.

In certain instances, such as when the resultant polyepoxide has an equivalent weight of above about 8000, the polyepoxides can be employed as solution coatings without the use of curing agents.

The degree of chain branching is determined by reacting the hydroxyl groups contained in the epoxy resin with trichloroacetyl isocyanate thereby forming a urethane group which produces a downfield shift of the associated methine proton absorption in nuclear magnetic resonance spectra which when combined with considerations of model structures the number of chain branch points can be calculated.

The following examples are illustrative of the present invention, but are not to be construed as to limiting the scope thereof in any manner. In all instances nitrogen was passed through the reactor.

EXAMPLE 1

To a reaction vessel equipped with a means for stirring, nitrogen addition and temperature control was added 0.05 parts by weight (based on resin charge) (0.06 grams) of trimethyltin chloride dissolved in 6.0 parts by weight (30 grams) of p-xylene and 27.44 parts by weight (137.2 grams) of the diglycidyl ether of p,p'-isopropylidine diphenol having an epoxide equivalent weight (EEW) of 192. After thorough stirring, 12.56 parts by weight (62.8 grams) of p,p'-isopropylidine diphenol (bisphenol-A) was added. The reaction vessel was purged with nitrogen and the temperature was maintained between 185° and 190°C for 5 hours. After cooling 19.28 parts by weight (96.41 grams) of p-xylene and 34.71 parts by weight (173.6 grams) of methyl isobutyl ketone was added resulting in a final product solution of 40 percent by weight on a solids basis. Analysis of the final product revealed the thus prepared polyepoxide to have an epoxide content of 3.56 percent by weight on a solids basis. Based upon the ratio of the starting materials, the theoretical percent epoxide of the final product is 3.5 percent by weight.

EXAMPLE 2

In a manner similar to Example 1 above, a polyepoxide was prepared from the following starting materials under the stated reaction conditions.

0.10 parts by weight (0.15 grams) based on resin charge of triphenyltin chloride dissolved in 8.88 parts by weight (35.29 grams) of p-xylene, 39.35 parts by weight (157.42 grams) of the diglycidyl ether of bisphenol-A having an EEW of 192.

10.64 parts by weight (42.58 grams) of bisphenol-A.

The reaction was conducted between 155° and 160°C for 5 hours. After cooling, the final product was reduced to a 50 percent solids content by the addition of 7.92 parts by weight (31.7 grams) of p-xylene and 33.25 parts by weight (133 grams) of methyl isobutyl ketone. Analysis of the final product revealed the resultant polyepoxide to have an epoxide content of 10 percent by weight on a solids basis. The theoretical percent epoxide based upon the ratio of the reactants is 9.5 percent by weight.

EXAMPLE 3

In a manner similar to Example 1 above, a polyepoxide was prepared from the following starting materials under the stated reaction conditions.

- 0.0324 parts by weight (0.13 gram) of dibutyltindichloride dissolved in 3.77 parts by weight (15.1 grams) of p-xylene,
- 33.48 parts by weight (134 grams) of the diglycidyl ether of bis-phenol-A having an EEW of 192,
- 16.49 parts by weight (66 grams) of bisphenol-A.

The reaction was conducted between 185° and 190°C for 4 ½ hours. After cooling, the final product was reduced to a 50 percent solids content by the addition of 46.2 parts by weight (184.9 grams) of methyl isobutyl ketone. Analysis of the final product revealed the resultant polyepoxide to have an epoxide content of 2.4 percent by weight on a solids basis. The theoretical percent epoxide based upon the ratio of the reactants is 2.5 percent by weight.

EXAMPLE 4

In a manner similar to Example 1 above, a polyepoxide was prepared from the following starting materials under the stated reaction conditions.

- 0.033 parts by weight (0.2 gram) of trimethyl-tin iodide dissolved in 5.56 parts by weight (33.39 grams) of p-xylene,
- 33.32 parts by weight (200 grams) of the diglycidyl ether of bis-phenol-A having an EEW of 192,
- 16.66 parts by weight (100 grams) of bisphenol-A.

The reaction was conducted between 187° and 195°C for 10 hours. After cooling, the final product was reduced to a 50 percent solids content by the addition of 44.41 parts by weight (266.5 grams) of methyl isobutyl ketone. Analysis of the final product revealed the resultant polyepoxide to have an epoxide content of 2.46 percent by weight on a solids basis. The theoretical percent epoxide based upon the ratio of the reactants is 2.5 percent by weight.

EXAMPLE 5

In a manner similar to Example 1 above, a polyepoxide was prepared from the following starting materials under the stated reaction conditions.

- 0.032 parts by weight (0.134 gram) of tributyltin methoxide dissolved in 5.49 parts by weight (22 grams) of p-xylene,
- 33.48 parts by weight (134 grams) of the diglycidyl ether of bis-phenol-A having an EEW of 192,
- 16.49 parts by weight (66 grams) of bisphenol-A.

The reaction was conducted between 185° and 190°C for 6 ½ hours. After cooling, the final product was reduced to a 50 percent solids content by the addition of 44.48 parts by weight (178 grams) of methyl isobutyl ketone. Analysis of the final product revealed the resultant polyepoxide to have an epoxide content of 2.47 percent by weight on a solids basis. The theoretical percent epoxide based upon the ratio of the reactants is 2.5 percent by weight.

EXAMPLE 6

In a manner similar to Example 1 above, a polyepoxide was prepared from the following starting materials under the stated reaction conditions.

- 0.051 parts by weight (0.205 gram) of trimethyl tin hydroxide dissolved in 8.32 parts by weight (33.3 grams) of p-xylene,
- 51.22 parts by weight (205.02 grams) of the diglycidyl ether of bisphenol-A having an EEW of 192,
- 23.73 parts by weight (94.98 grams) of bisphenol-A.

The reaction was conducted between 155° and 160°C for 6 hours. After cooling, the final product was reduced to a 75 percent solids content by the addition of 16.66 parts by weight (66.7 grams) of methyl isobutyl ketone. Analysis of the final product revealed the resultant polyepoxide to have an epoxide content of 3.51 percent by weight on a solids basis. The theoretical percent epoxide based upon the ratio of the reactants is 3.5 percent by weight.

EXAMPLE 7

Further examples of catalysts for promoting the reaction between polyepoxides and hydroxyl-containing compounds are given in Table I.

The following charge was employed:

- 33.45 parts by weight (44.0 grams) of the diglycidyl ether of bisphenol-A having an EEW of 192,
- 16.47 parts by weight (21.67 grams) of bisphenol-A,
- 0.067 parts by weight (0.088 gram) of catalyst,
- 8.82 parts by weight (11.6 grams) of p-xylene The reaction vessel was purged thoroughly with nitrogen and the reaction mixture heated at 175° to 180°C for 5 hours. After cooling the mixture was reduced to a 50 percent solids content by the addition of 41.18 parts by weight (54.16 grams) of methyl isobutyl ketone.

Catalyst activity is obviously seen when the results are compared with the reaction carried out in the absence of catalyst.

TABLE I

Epoxide content, percentage by weight on a solids basis after 5 hours reaction

| Catalyst | Epoxide Content |
|---|---|
| None | 7.60 |
| Trimethyltin bromide | 4.36 |
| Trimethyltin fluoride | 4.36 |
| Dimethyltin dichloride | 4.75 |
| Dimethyltin difluoride | 5.54 |
| Diethyltin dichloride | 6.09 |
| Butyltin trichloride | 6.37 |
| Dibutyltin sulphide | 4.07 |
| Bis (tri-n-butyltin) sulphide | 3.48 |
| Tributyltin chloride | 4.52 |
| Tributyltin bromide | 5.73 |
| Tributyltin acetate | 5.32 |
| Bis (tri-n-butyltin) oxide | 4.96 |
| Dioctyltin dichloride | 4.40 |
| Trimethylsilicon chloride | 4.52 |
| Triethylsilicon chloride | 3.72 |
| Triphenylsilicon chloride | 3.78 |
| Diphenylsilicon dichloride | 4.91 |
| Diphenylgermanium dichloride | 3.86 |
| Tributylgermanium chloride | 4.07 |
| Diphenyllead dichloride | 6.68 |
| Triethyllead chloride | 5.10 |

A further advantage of the new catalyst is that high molecular weight resins may be prepared that are either linear in molecular structure or have any desired degree of chain branching. Generally the degree of chain branching is dependent upon the type of catalyst selected. Those catalysts containing a tin-oxygen bond appear to control chain branching not only by type but also by their concentration. This latter effect may not be restricted entirely to the Sn-O bond.

EXAMPLE 8

This example employed the reactants in Example 7 and the catalysts and concentration and results are indicated in Table II.

TABLE II

| Catalyst | Catalyst Conc. Parts by Wt. | Reaction % Epoxide | Product % Chain Branching |
|---|---|---|---|
| Trimethyltin chloride | 0.1 | 3.5 | 8 |
| Trimethyltin iodide | 0.1 | 2.5 | 11 |
| Trimethyltin bromide | 0.4 | 2.5 | 10 |
| Trimethylsilicon chloride | 0.1 | 3.8 | 22 |
| Trimethyltin hydroxide | 0.05 | 3.9 | 24 |
| | 0.10 | 3.8 | 15 |
| | 0.15 | 3.3 | 13 |
| | 0.30 | 3.3 | 6 |
| | 0.40 | 3.8 | 0 |
| Tributyltin methoxide | 0.1 | 3.5 | 16 |
| | 0.2 | 3.5 | 12 |
| | 0.4 | 3.5 | 8 |

We claim:

1. A process for preparing compositions higher in molecular weight than the starting components which process comprises reacting at temperatures from about 50° to about 300°C a polyepoxide having more than one 1,2-epoxy groups with an aromatic polyhydroxyl-containing compound in the presence of, as a catalyst therefor, a catalytic amount of an organometal compound represented by the general formula $$[(R)_{4-y}M]_z(X)_y$$

wherein each R is independently selected from the group consisting of alkyl groups having from about 1 to about 10 carbon atoms, aryl groups, alkaryl groups and aralkyl groups, X is an alkoxide, an alkanoate, sulfur, oxygen, hydroxide or a halogen having an atomic number from 9 to 53 inclusive, M is tin, silicon, germanium or lead, $y$ is an integer from 1 to 2, $z$ has a value of 1 or 2 and when $z$ is 2, X is oxygen or sulfur.

2. The process of claim 1 wherein the catalyst is an organotin compound.

3. The process of claim 2 wherein the polyepoxide is the diglycidyl ether of bisphenol A and the polyhydroxyl-containing compound is bisphenol A.

4. The process of claim 1 wherein the catalyst is an organosilicon compound.

5. The process of claim 4 wherein the polyepoxide is the diglycidyl ether of bisphenol A and the polyhydroxyl-containing compound is bisphenol A.

6. The process of claim 1 wherein the catalyst is an organo lead compound.

7. The process of claim 6 wherein the polyepoxide is the diglycidyl ether of bisphenol A and the polyhydroxyl-containing compound is bisphenol A.

8. The process of claim 1 wherein the catalyst is an organogermanium compound.

9. The process of claim 8 wherein the polyepoxide is the diglycidyl ether of bisphenol A and the polyhydroxyl-containing compound is bisphenol A.

* * * * *